United States Patent
Brock et al.

[11] Patent Number: 4,766,029
[45] Date of Patent: Aug. 23, 1988

[54] SEMI-PERMEABLE NONWOVEN LAMINATE

[75] Inventors: Robert J. Brock, Marietta; William Conn, Stone Mountain; James M. Weber, Marietta, all of Ga.

[73] Assignee: Kimberly-Clark Corporation, Neenah, Wis.

[21] Appl. No.: 6,526

[22] Filed: Jan. 23, 1987

[51] Int. Cl.$^4$ ............................................. B32B 27/00
[52] U.S. Cl. .................................. 428/286; 156/62.2; 156/62.4; 156/62.8; 428/288; 428/296; 428/373; 428/374
[58] Field of Search .............. 428/286, 288, 296, 373, 428/374; 156/62.2, 62.4, 62.8

[56] References Cited

U.S. PATENT DOCUMENTS

| | | | |
|---|---|---|---|
| 3,509,009 | 4/1970 | Hartmann et al. | 161/150 |
| 3,639,195 | 2/1972 | Sanders et al. | 156/62.2 |
| 3,841,953 | 10/1974 | Lohkamp et al. | 161/150 |
| 3,914,497 | 10/1975 | Kanehira et al. | 428/288 |
| 4,323,626 | 4/1982 | Kunimune et al. | 428/374 |
| 4,384,098 | 5/1983 | Hagler et al. | 526/348.1 |
| 4,555,811 | 12/1985 | Shimalla et al. | 2/51 |
| 4,632,861 | 12/1986 | Vassilatos | 428/296 |

Primary Examiner—Marion C. McCamish
Attorney, Agent, or Firm—William D. Herrick

[57] ABSTRACT

A house wrap consists of a three-layer, semi-permeable, nonwoven laminate. The two exterior layers are spunbond polypropylene having a melt flow of 35 grams per ten minutes at 230° C. The interior layer is a two-component melt-blown layer of polyethylene and polypropylene. The polypropylene has a melt flow of 260 and the polyethylene has a melt flow of 350. The laminate is calendered after formation so that the polyethylene melts and flows to close up the interstitial space and to bond the layers together to create a strong semi-permeable laminate.

12 Claims, 1 Drawing Sheet

SEMI-PERMEABLE NONWOVEN LAMINATE

BACKGROUND OF THE INVENTION

This invention relates generally to a semi-permeable nonwoven laminate which is useful as a house wrap, and more particularly concerns a laminate having spun-bonded exterior layers and a two-component, melt-blown interior layer which is rendered partially adhesive by the application of heat and pressure to bind together the layers of the laminate.

In housing construction, it is common practice to install an insulating board, generally of polyurethane foam, between the siding on the house and the house frame. It has become increasingly common to also use a fabric material (house wrap) between the insulating board and the siding which fabric material serves to inhibit the infiltration of air or water into the house but at the same time allows expiration of water vapor from the inside of the walls to the outside so that moisture does not build up in the walls thus producing mildew and rotting. A conventional house wrap is sold under the trademark TYVEK by DuPont of Wilmington, Del. Tyvek is a solution cast polyethylene web.

SUMMARY OF THE INVENTION

It is an object of the present invention to provide a semi-permeable nonwoven house wrap laminate which on one hand will preclude the infiltration of air and water and on the other hand will allow the expiration of water vapor and which will have sufficient strength to withstand handling encountered during the construction process.

The foregoing object is achieved by a laminate with spun-bonded polypropylene exterior layers and an internal melt-blown layer having fibers formed from a fiber forming polymer (polyproplyene) and binder-filler polymer (polyethylene). Particularly, the internal melt-blown layer is formed by dry mixing a 50-50 blend of polypropylene and polyethylene pellets and then extruding the mixture through a conventional melt-blowing die. The polymer pellet mixture, however, can range from 70-30 to 30-70. The polypropylene and polyethylene polymers in the melt-blown layer are selected so that the polypropylene has a melt flow that is about 80-100 grams per ten minutes at 230° C. less than the melt flow for the polyethylene. The polypropylene in the spun-bonded external layer is chosen to have a melt flow about 200-315 grams per ten minutes at 230° C. less than the polyethylene that is used in the internal layer.

Upon the application of heat and pressure, the polyethylene portion of the two-component fibers in the internal layer softens to become an interstitial mass which flows into and closes up the interstitial spaces between the melt-blown polypropylene fibers. By closing the interstitial space within the melt-blown internal layer, the house wrap laminate is rendered semi-permeable. The melting and flowing of the polyethylene within the melt-blown layer also serves to bind together the polypropylene fibers within the melt-blown layer and to bind the exterior polypropylene spun-bonded layers to the internal melt-blown layer. Because the melt flows of the polypropylene in both internal and external layers are less than the melt flow of the polyethylene, the amount of heat and pressure which melts the polyethylene will not tend to degrade the strength of the polypropylene fibers and filaments in the laminate.

Other objects and advantages of the invention will become apparent upon reading the following detailed description and upon reference to the drawings.

DETAILED DESCRIPTION OF THE INVENTION

While the invention will be described in connection with a preferred embodiment and method, it will be understood that we do not intend to limit the invention to that embodiment or method. On the contrary, we intend to cover all alternatives, modifications, and equivalents as may be included within the spirit and scope of the invention as defined by the appended claims.

Figure 1:
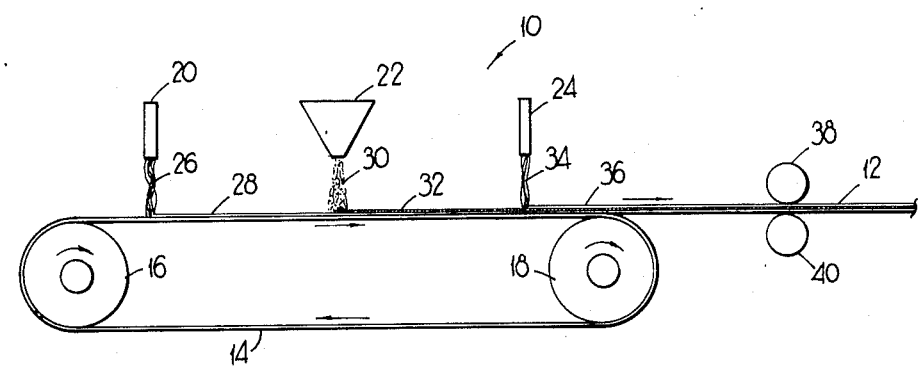
FIG. 1 is a schematic diagram of a nonwoven forming machine which is used in making the semi-permeable, nonwoven laminate of the present invention.

Turning to FIG. 1, there is shown a schematic of forming machine 10 which is used to produce a laminate 12 made in accordance with the present invention. Particularly, the forming machine 10 consists of an endless foraminous forming belt 14 wrapped around rollers 16 and 18 so that the belt 14 is driven in the direction shown by the arrows. The forming machine 10 has three stations, spun-bond station 20, melt-blown station 22, and spun-bond station 24.

The spun-bond stations 20 and 24 are conventional extruders or spinnerettes which form continuous filaments of polypropylene and deposit those filaments onto the forming belt 14 in a random interlaced fashion. The spun-bond stations 20 and 24 may include one or more spinnerette heads depending on the speed of the process and the particular polypropylene polymer being used. Forming spun-bonded material is conventional in the art and the design of such a spun-bonded forming station is thought to be well within the skill of those of ordinary skill in the art. Such level of skill is demonstrated by U.S. Pat. Nos. 3,338,992, and 3,341,394.

In accordance with the present invention, the spun-bond station 20 produces spun-bond filaments 26 from a filament forming polymer. The filaments are randomly laid on the belt 14 to form a spun-bonded external layer 28. The layer 28 has a basis weight of preferably 0.6 oz./yd.$^2$. The filament forming polymer is preferably Exxon 3125 polypropylene, which is manufactured by Exxon Corporation and has a melt flow of approximately 35 grams per ten minutes at 230° C.

The melt-blown station 22 consists of a die which is used to form microfibers 30. The microfibers 30 are randomly deposited on top of the spun-bond layer 28 and form a melt-blown layer 32. The construction and operation of the melt-blown station 22 for forming microfibers 30 and melt-blown layer 32 is considered conventional, and the design and operation are well within the skill of those of ordinary skill in the art. Such skill is demonstrated by NRL Report 4364, "Manufacture of Super-Fine Organic Fibers", by V.A. Wendt, E.L. Boon, and C.D. Fluharty; NRL Report 5265, "An Improved Device for the Formation of Super-Fine Thermoplastic Fibers", by K.D. Lawrence, R.T. Lukas, and J.A. Young; and, U.S. Pat. No. 3,849,241, issued Nov. 19, 1974, to Buntin, et al.

The melt-blown station 22 produces two-component microfine fibers 30 from a mixture of a fiber forming polymer and a binder-filler polymer. The fibers 30 are randomly deposited on top of spun-bond layer 28 to form a melt-blown internal layer 32. The layer 32 has a basis weight of preferably 0.6 oz./yd.$^2$. The fiber forming polymer is preferably Exxon 3145 polypropylene and has a melt flow of approximately 260 grams per ten minutes at 230° C. The preferred binder-filler polymer is Dowplex 61800.09 polyethylene manufactured by Dow Chemical of Midland, Mich. The polyethylene has a melt flow of 350 grams per ten minutes at 230° C. It is important that the difference in melt flow between the polyethylene and polypropylene be maintained at not less than about 80 grams per ten minutes for reasons that will become apparent. In order to produce such two-component fibers, polypropylene and polyethylene resin pellets are dry-mixed prior to extrusion in a ratio by weight between 70-30 and 30-70 with the preferred ratio being 50-50.

After the internal layer 32 has been deposited by the melt-blown station 22 onto layer 28, spun-bond station 24 produces spun-bond filaments 34 of polypropylene which are deposited in random orientation on top of the melt-blown layer 32 to produce external spun-bond layer 36. The layer 36 has a basis weight of preferably 0.7 oz./yd.$^2$. Spun-bond layer 36 is preferably formed from Exxon 3125 polypropylene having a melt flow of 35 grams per ten minutes at 230° C.

The polymers are selected so that there is a differential of at least 80 grams per ten minutes at 230° C. between the polyethylene binder-filler and the polypropylene fiber forming polymer in the melt-blown layer and a difference of at least 200 grams per ten minutes at 230° C. between the polyethylene binder-filler of the internal melt-blown layer and the polypropylene filament forming polymer in the external spun-bonded layer.

Figure 2:
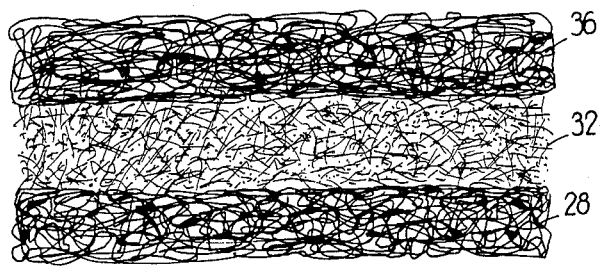
FIG. 2 is a cross section view of the semi-permeable nonwoven laminate of the present invention showing the layer configuration.

Once the three layers, FIG. 2, spun-bond layer 28, melt-blown layer 32, and spun-bond layer 36, are formed, the resulting laminate is drawn through calender rolls 38 and 40. The calender rolls are heated to a temperature from 260° F. to 300° F. and are set at a pressure between 167.5 lbs. per lineal inch and 342.9 lbs. per lineal inch. The laminate 12 is fed through the calender rolls at a speed from 12 feet per minute to 24 feet per minute. Preferably, calendering is carried out at 18 feet per minute at 228.6 lbs. per lineal inch of pressure and at temperatures between 270° F. and 290° F. Within the ranges of temperature, pressure, and speed set out, the binder-filler polymer (polyethylene) will melt to create an interstitial mass which will flow into and close up the interstitial space between the polypropylene fibers to render the laminate 12 semi-permeable so that infiltration of air will be inhibited while allowing expiration of water vapor. In addition, the melted polyethylene will serve to bind together the layers of the laminate. Because of the difference in melt flow between the polyethylene and the two polypropylenes, the strength of the polypropylenes will not be significantly degraded by the heat and pressure of the calendering process.

In order to illustrate the invention, the laminates of the present invention were formed and calendered under varying calendering conditions (temperature, pressure, and speed) and the physical characteristics (tensile strength, tear strength, air permeability, and moisture vapor permeability) were compared. The house wrap laminate made in accordance with the present invention consisted of external layers of spun-bonded polypropylene (Exxon 3125) having a basis weight of 0.6 oz./yd.$^2$ and the other having a basis weight of 0.7 oz./yd.$^2$. The internal melt-blown layer had a basis weight of 0.6 oz./yd.$^2$ and was a 50-50 mix by weight of polypropylene (Exxon 3145) and polyethylene (Dowplex 61800.09). The polyethylene and polyethylene pellets were dry mixed prior to extruding. Once formed, the laminate was calendered at various temperatures, pressures, and speeds, and the physical characteristics for each calender run were measured. The strength of the house wrap was based on testing for tensile strength and tear strength. Tensile strength (Grab Method) was determined in accordance with Federal Test Method (FTM) No. 191, Method 5100. Tear strength (Trapezoid) was determined in accordance with FTM No. 191, Method 5136. Air permeability was determined in accordance with FTM No. 191, Method 5450. Testing for air permeability demonstrates the ability of the house wrap to preclude the infiltration of air. The lower the air permeability is, the better the house wrap is. Moisture vapor permeability was determined in accordance with FTM No. 406, Method 7032. Moisture vapor permeability demonstrates the ability of the house wrap to allow the expiration of water vapor to the outside. The higher the moisture vapor permeability is, the better the house wrap is.

The following Table 1 summarizes the results:

TABLE 1

(Part 1)
GRAB TENSILE DATA (lbs/in$^2$)

| Calender Pressure (pounds/ lineal inch) | Temperature °F. | | | | |
|---|---|---|---|---|---|
| | 260 | 270 | 280 | 290 | 300 |
| Calender Speed: 12 feet/minute | | | | | |
| 167.5 | 17.3 | 26.4 | 30.7 | 31.1 | 15.2 |
| 228.6 | 19.9 | 32.8 | 32.4 | 28.7 | 12.6 |
| 285.7 | 18.9 | 22.2 | 24.6 | 35.6 | **** |
| 342.9 | 20.6 | 30.7 | 31.8 | 27.2 | **** |
| Calender Speed: 18 feet/minute | | | | | |
| 167.5 | 16.2 | 18.4 | 23.5 | 31.6 | 23.3 |
| 228.6 | 17.8 | 19.8 | 25.3 | 34.1 | 22.7 |
| 285.7 | 16.5 | 20.4 | 24.9 | 35.6 | 21.1 |
| 342.9 | 19.1 | 21.6 | 26.4 | 34.6 | 24.3 |
| Calender Speed: 24 feet/minute | | | | | |
| 167.5 | 9.8 | 14.4 | 24.6 | 31.9 | 25.7 |
| 228.6 | 12.9 | 17.8 | 23.6 | 30.7 | 25.2 |
| 285.7 | 16.6 | 20.6 | 20.9 | 28.4 | 24.9 |
| 342.9 | 16.9 | 17.9 | 23.6 | 31.7 | 24.6 |

(Part 2)
TRAP TEAR DATA (lbs)

| Calender Pressure (pounds/ lineal inch) | Temperature °F. | | | | |
|---|---|---|---|---|---|
| | 260 | 270 | 280 | 290 | 300 |
| Calender Speed: 12 feet/minute | | | | | |
| 167.5 | 9.5 | 11.7 | 11.3 | 4.2 | 0.87 |
| 228.6 | 10.1 | 11.8 | 9.9 | 2.6 | 0.76 |
| 285.7 | 9.0 | 10.6 | 10.8 | 5.3 | **** |
| 342.9 | 10.1 | 11.1 | 8.5 | 1.6 | **** |
| Calender Speed: 18 feet/minute | | | | | |
| 167.5 | 7.6 | 8.3 | 10.0 | 8.8 | 1.2 |
| 228.6 | 9.1 | 9.4 | 11.1 | 9.4 | 1.6 |
| 285.7 | 8.3 | 9.0 | 10.3 | 5.4 | 1.7 |
| 342.9 | 8.1 | 10.1 | 10.5 | 3.1 | 1.4 |
| Calender Speed: 24 feet/minute | | | | | |
| 167.5 | 5.7 | 7.5 | 10.1 | 8.0 | 2.9 |
| 228.6 | 7.7 | 7.4 | 10.6 | 8.6 | 2.3 |
| 285.7 | 7.6 | 9.9 | 9.7 | 9.9 | 2.0 |

TABLE 1-continued

(Part 3)
FRAZIER (AIR) PERMEABILITY
(ft³ air/ft² material/minute)

| Calender Pressure (pounds/lineal inch) | Temperature °F. | | | | |
|---|---|---|---|---|---|
| | 260 | 270 | 280 | 290 | 300 |
| Calender Speed: 12 feet/minute | | | | | |
| 167.5 | 2.15 | 1.94 | 1.19 | 3.46 | 10.62 |
| 228.6 | 0.58 | 0.75 | 1.14 | 1.31 | 7.42 |
| 285.7 | 0.87 | 0.37 | 0.49 | 1.47 | **** |
| 342.9 | 0.58 | 0.56 | 0.53 | 3.88 | **** |
| Calender Speed: 18 feet/minute | | | | | |
| 167.5 | 2.60 | 1.85 | 0.00 | 1.87 | 1.51 |
| 228.6 | 1.85 | 0.87 | 1.31 | 0.89 | 1.53 |
| 285.7 | 1.16 | 0.68 | 0.92 | 0.79 | 2.53 |
| 342.9 | 0.95 | 0.66 | 0.94 | 1.61 | 0.97 |
| Calender Speed: 24 feet/minute | | | | | |
| 167.5 | 8.98 | 1.47 | 0.26 | 2.75 | 3.81 |
| 228.6 | 3.68 | 1.14 | 0.81 | 2.67 | 2.68 |
| 285.7 | 1.79 | 0.95 | 1.04 | 0.79 | 1.69 |
| 342.9 | 2.96 | 1.71 | 0.31 | 2.32 | 2.32 |

(Part 4)
MOISTURE VAPOR TRANSMISSION
(g. water vap/m² material/24 hrs)

| Calender Pressure (pounds/lineal inch) | Temperature °F. | | | | |
|---|---|---|---|---|---|
| | 260 | 270 | 280 | 290 | 300 |
| Calender Speed: 12 feet/minute | | | | | |
| 167.5 | 736 | 509 | 706 | 653 | 560 |
| 228.6 | 623 | 597 | 395 | 593 | **** |
| 285.7 | 581 | 443 | 397 | 501 | **** |
| 342.9 | 463 | 431 | 466 | 581 | **** |
| Calender Speed: 18 feet/minute | | | | | |
| 167.5 | 664 | 826 | 688 | 751 | 1071 |
| 228.6 | 684 | 881 | 545 | 564 | 736 |
| 285.7 | 747 | 671 | 563 | 522 | 375 |
| 342.9 | 679 | 758 | 525 | 580 | 359 |
| Calender Speed: 24 feet/minute | | | | | |
| 167.5 | 917 | 880 | 790 | 784 | 775 |
| 228.6 | 899 | 714 | 744 | 686 | 629 |
| 285.7 | 819 | 812 | 626 | 501 | 603 |
| 342.9 | 561 | 798 | 800 | 698 | 643 |

Acceptable house wrap was produced for all runs in Table 1 above for temperatures below 290° F. The optimum appeared to exist at a pressure of 228.6 lbs./lineal inch, a speed of 18 ft./minute and at temperatures between 270° F. and 290° F.

The house wrap of the present invention (the same as used for Table 1) was then compared to a proposed all-polypropylene house wrap (control). The control house wrap was a laminate consisting of three layers. The first exterior layer was spun-bonded polypropylene (Exxon 3125) with a basis weight of 0.6 oz./yd.². The interior layer was melt-blown polypropylene (Exxon 3145) with a basis weight of 0.6 oz./yd.². The other exterior layer was spun-bonded polypropylene (Exxon 3125) with a basis weight of 0.7 oz./yd.². The calender pressure was set at 228.6 lbs./lineal inch and speed was 18 ft./minute. Temperature was varied, and the physical characteristics measured. The results are summarized in Table 2 below:

TABLE 2

(Part 1)

HOUSE WRAP (present invention)
0.6 oz./yd.² PP SB;
0.6 oz./yd.² MB 50%–50% mix PP/PE;
0.7 oz./yd.² PP SB CONTROL
0.6 oz./yd.² PP SB;
0.6 oz./yd.² MB 100% PP;
0.7 oz./yd.² PP SB

GRAB TENSILE DATA (lbs/in²) vs TEMPERATURE °F.

| Temp °F. | House wrap | Control |
|---|---|---|
| 260 | 17.8 | 6.9 |
| 270 | 19.8 | 6.9 |
| 280 | 25.3 | 11.0 |
| 290 | 34.1 | 14.3 |
| 300 | 22.7 | 32.5 |

(Part 2)
TRAP TEAR (lbs) vs TEMPERATURE °F.

| Temp °F. | House wrap | Control SMS |
|---|---|---|
| 260 | 9.1 | 6.5 |
| 270 | 9.4 | 6.6 |
| 280 | 11.1 | 7.7 |
| 290 | 9.4 | 9.9 |
| 300 | 1.6 | 6.8 |

FRAZIER PERMEABILITY (ft³/ft²/minute) vs TEMPERATURE

| Temp °F. | House wrap | Control |
|---|---|---|
| 260 | 1.85 | 4.9 |
| 270 | 0.87 | 5.6 |
| 280 | 0.92 | 2.5 |
| 290 | 0.89 | 2.0 |
| 300 | 1.53 | 1.1 |

MOISTURE VAPOR TRANSMISSION (g./m²/24 hours) vs TEMPERATURE

| Temp °F. | Housewrap SMS | Control SMS |
|---|---|---|
| 260 | 1197 | 1639 |
| 270 | 1184 | 1560 |
| 280 | 979 | 1683 |
| 290 | 920 | 1395 |
| 300 | 754 | 819 |

For the operating conditions in Table 2, the house wrap of the present invention was superior in tensile strength, tear strength, and air permeability below 280° F. and except for tear strength was superior below 290° F. The moisture vapor permeability was, however, reduced by 3%–37%.

We claim:

1. A semi-permeable laminate comprising:
   (a) an interior layer comprising:
      (i) an array of randomly dispersed microfibers formed from a fiber forming polymer having a melt flow; and
      (ii) an interstitial mass, between and among the microfibers, closing up interstitial spaces, formed from a binder-filler polymer having a melt flow, wherein the melt flow of the fiber forming polymer is at least about 80 grams per ten minutes at 230° C. less than the melt flow of the binder-filler polymer; and
   (b) at least one exterior layer bonded to the interior layer by means of of the binder-filler polymer of the interior layer, the exterior layer comprising an array of randomly laid, continuous filaments formed from a filament forming polymer having a melt flow, wherein the melt flow of the filament forming polymer is at least about 200 grams per ten minutes at 230° C. less than the melt flow of the binder-filler polymer.

2. The laminate of claim 1, wherein the melt flow of the fiber forming polymer is 80–100 grams per ten minutes at 230° C. less than the melt flow of the binder-filler polymer in the interior layer.

3. The laminate of claim 2, wherein the melt flow of the filament forming polymer is 200-315 grams per 10 minutes at 230° C. less than the melt flow of the binder-filler polymer.

4. The laminate of claim 2 or 3 wherein the fiber forming polymer and the filament forming polymer are polypropylene and the binder-filler polymer is polyethylene.

5. A method for forming a semi-permeable nonwoven laminate comprising the steps of:
   (a) depositing an exterior layer of randomly-laid, continuous filaments of filament forming polymer having a melt flow;
   (b) subsequently depositing an interior layer of randomly-dispersed microfibers onto the exterior layer, the microfibers formed by melt-blowing the fibers from a mixture of a fiber forming polymer having a melt flow and a filler-binder polymer having a melt flow wherein the melt flow of the filament forming polymer is at least 200 grams per ten minutes at 230° C. less than and the melt flow of the fiber-forming polymer is at least about 80 grams per ten minutes at 230° C. less than the melt flow of the filler-binder polymer; and
   (c) hot calendering the layers together at a temperature, pressure, and speed that causes remelting and flowing of the filler-binder polymer closing up interstitial spaced between fibers and interbonding the layers but does not cause remelting of the filament forming polymer and the fiber forming polymer.

6. The method of claim 5 wherein the melt flow of the fiber forming polymer is 80-100 grams per ten minutes at 230° C. less than the melt flow of the binder-filler polymer.

7. The method of claim 6, wherein the melt flow of the filament forming polymer is 200-315 grams per ten minutes at 230° C. less than the melt flow of the binder-filler polymer.

8. The method of claim 6 or 7 wherein the fiber forming polymer and the filament forming polymer are polypropylene and the binder-filler polymer is polyethylene.

9. The method of claim 5, wherein the calender temperature is between 260° F. and 290° F., the calender pressure is between 167.5 pounds per lineal inch and 342.9 pounds per lineal inch, and the calender speed is between 12 feet per minute and 24 feet per minute.

10. The method of claim 9, wherein the melt flow of the fiber forming polymer is 80-100 grams per ten minutes at 230° C. less than the melt flow of the binder-filler polymer.

11. The method of claim 10, wherein the melt flow of the filament forming polymer is 200-315 grams per ten minutes at 230° C. less than the melt flow of the binder-filler polymer.

12. The method of claim 10 or 11, wherein the fiber forming polymer and the filament forming polymer are polypropylene and the binder-filler polymer is polyethylene.

* * * * *

UNITED STATES PATENT AND TRADEMARK OFFICE
CERTIFICATE OF CORRECTION

PATENT NO. : 4,766,029

DATED : August 23, 1988

INVENTOR(S) : Robert J. Brock et al

It is certified that error appears in the above-identified patent and that said Letters Patent is hereby corrected as shown below:

Column 3, line 41, delete "Fig. 2"

Column 7, line 30, "spaced" should read --spaces--.

Signed and Sealed this

Fourteenth Day of March, 1989

Attest:

DONALD J. QUIGG

*Attesting Officer*    *Commissioner of Patents and Trademarks*